June 27, 1939.   J. P. ORRIS   2,163,803
PISTON AND CONNECTING ROD CONSTRUCTION
Filed June 15, 1936
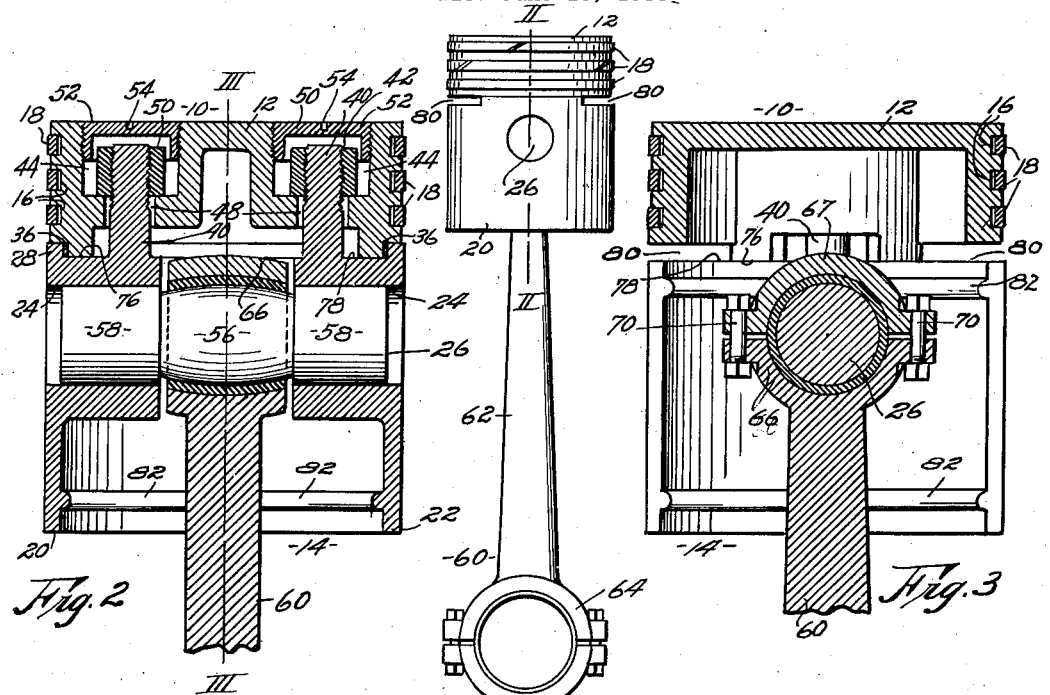
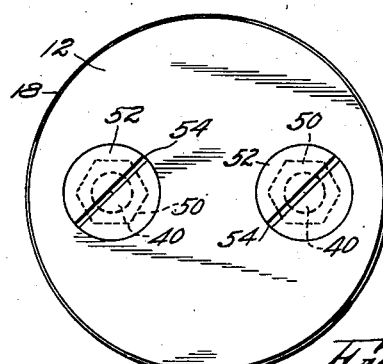
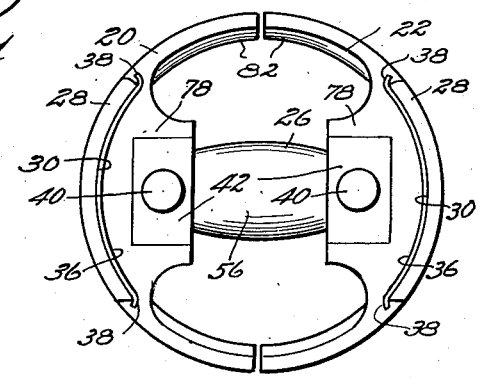
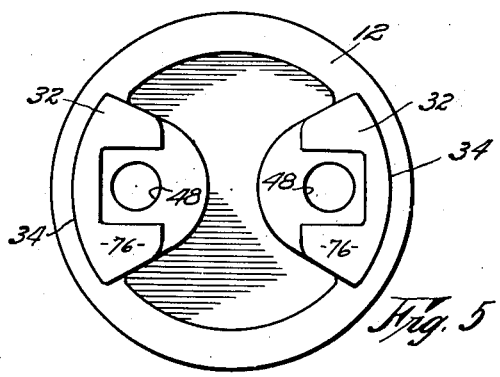
INVENTOR,
John P. Orris.
BY
Hovey & Hamilton,
ATTORNEYS.

Patented June 27, 1939

2,163,803

UNITED STATES PATENT OFFICE 2,163,803

PISTON AND CONNECTING ROD CONSTRUCTION

John Pearl Orris, Kansas City, Mo.

Application June 15, 1936, Serial No. 85,337

3 Claims. (Cl. 309—15)

This invention relates to piston and connecting rod construction and especially to pistons and connecting rod structure for internal combustion engines.

The principal object of this invention is the provision of a simple and inexpensive piston and connecting rod structure that is self-aligning and is provided with means whereby it may be adjusted and reground to properly fit the cylinder.

Another object of the present invention is the provision of pistons having an ovate transverse wrist pin whereon the connecting rod is connected to allow adjustment of the piston to the cylinder wall.

A further object is the provision of a piston and connecting rod structure wherein the parts are so interconnected that they may be assembled and disassembled from the top of the piston and without removing the piston from the cylinder in which it is used.

With these and other objects which will appear during the course of the specification in view, reference will now be had to the drawing, wherein:

Figure 1 is an elevation of a piston and connecting rod embodying this invention.

Fig. 2 is an enlarged, central, sectional view, taken on line II—II of Fig. 1.

Fig. 3 is a sectional view taken on line III—III of Fig. 2.

Fig. 4 is a plan view of the piston.

Fig. 5 is an inverted plan view of the removable head, and,

Fig. 6 is a plan view of the two-piece skirt detached.

Throughout the several views, like reference characters designate similar parts, and the numeral 10 indicates a piston, comprising a removable head 12 and a two-piece skirt 14. This piston is preferably cast from a suitable light weight, durable material and finished to properly fit the associated parts. The removable head 12 is provided in its outer wall with a series of annular grooves 16 adapted to receive rings 18 of the split type.

The two-piece skirt 14 consists of two similar semi-circular members 20 and 22, having transversely disposed bearings 24, which are in diametrical alignment and adapted to receive wrist pin 26. Extending upwardly from 20 to 22, above said bearings 24, is an arcuate rib 28, having its outer face flush with the semi-cylindrical wall of its respective skirt member and the inner wall 30 thereof concentric with the axis of the cylinder. The under side of removable head 12 is provided with projecting lugs 32, having an arcuate outside wall 34 adapted to normally engage the inner wall of 28.

When the skirt members become worn and need to be reground, it becomes necessary to insert a shim 36 between walls 30 and 34 in order to obtain a sufficient diameter of the skirt, after the grinding, to properly fit the cylinder. Shim 36 is made substantially the same length as rib 28 and has its end portions 38 offset to prevent longitudinal movement of the shim relative to the adjacent walls. It is apparent that sims of different thicknesses might be used to compensate for the different degrees of wear of the rubbing parts of the piston.

Extending upwardly from each of the skirt sections 20 and 22 is a stud 40. These studs may be integral with the casting, screwed to position in the casting, or made a part of an insert which is cast into the skirt members. In the present showing the stud 40 is made a part of the steel insert 42, which is intended to strengthen the parts about the bearing and insure rigid connections between the parts. Studs 40 are threaded at their outer ends as at 42. Head 12 is provided with recesses 44 having a bottom wall 46 through which is formed openings 48. These openings are large enough on the radial line of the piston to permit transverse adjustment of studs 40 which are adapted to be positioned therethrough with the threaded ends thereof extending into their respective recess 44. Nuts 50 co-operate with the threaded portion of 40 and engage wall 46 to secure the parts of the piston in operative position. For the purpose of presenting a smooth upper surface at the explosion end of the piston, screwthreaded plugs 52 are screwed into recesses 44 flush with the top of the head. A screw driver slot 54 is provided in the plug for convenience of removal and setting.

It will be observed that the bearings 24 are in axial alignment and adapted to receive wrist pin 26 when the piston parts are interconnected as just described. The central portion 56 of the wrist pin positioned between the bearings is formed to present an ovate surface with its major axes common with the axes of the cylindrical end portions 58 which operatively engage the bearings. The major diameter of 56 is the same as that of the ends 58. This ovate portion 56 is generated by rotating an arcuate line about the axis of the wrist pin, with the radius of the arcuate line passing through a point equidistant from the ends of the wrist pin.

Referring now to the connecting rod 60, it will be observed that it is provided with the usual shank 62, crank shaft bearing 64, and wrist pin bearing 66. This wrist pin bearing 66 is made to conform to the ovate surface of the wrist pin and is slightly spaced apart from the bearing members 24. The usual construction of bearings of this character is followed in that the cap 67 is secured to the head 68 of rod 60 by bolts 70, and the intermediate bearing sleeve 72 is used. During the operation of this piston and connecting rod construction there will be some tendency for the piston to rock in the plane of the axis of the wrist pin. This particular movement of the parts is permitted because of the arcuate form of the bearing and the fact that a small clearance is provided between the bearing parts. This feature permits of a more perfect alignment of the piston in the cylinder, without interfering with the action of the connecting rod.

When the parts are assembled the planar surfaces 76 of lugs 32 rest on the flat surfaces 78 to insure perfect alignment of the parts, and when so positioned, other portions of the head and skirt members are separated to form openings 80, through which oil may pass to facilitate lubrication. Reenforcing ribs 82 are provided in each of the skirt members to maintain the proper shape thereof.

It is very evident that this invention provides a piston and rod connection that is easily accessible for removal or repair by simply removing the head of the motor, where access may be had to the securing members. Furthermore, this invention presents a simple but sturdy structure which will operate to insure perfect alignment of the parts.

Having thus described the invention, what is claimed as new and desired to be secured by Letters Patent is:

1. A piston comprising a head member having piston ring grooves in the outer wall thereof and having holes formed through the top wall; a two-piece skirt having transverse bearings adapted to receive a wrist pin; a stud carried by each of said skirt members extending through the holes formed through the top wall of said head member and adapted to have transverse adjustment therein; adjustable members associated with said studs whereby said head and skirt members are secured together; and segmental, spaced-apart, substantially concentric walls carried by said head and skirt members; and shims positioned between adjacent walls whereby the head and skirt members are positioned in operative position, with openings therebetween to permit free flow of oil from the inside to the outside of said piston.

2. A piston comprising a head and a two-piece skirt; recesses formed inwardly from the outer face of said head and having an opening formed in the bottom wall thereof; each of said skirt members having a threaded stud extending through one of said openings and provided with a nut whereby the head and skirt members are secured together, said studs being of less diameter than the diameter of said holes to permit transverse movement of said skirt members relative to said head; a plug adapted to be fitted into each of said recesses; arcuate segmental ribs extending downwardly from said head; and an upwardly extending boss on each of said skirt members having a wall concentric with said head rib and adapted to be spaced apart therefrom by an arcuate shim whereby the piston parts are secured in alignment.

3. A piston comprising a head member having piston ring grooves in the outer wall thereof; a two piece skirt having transverse bearings adapted to receive a wrist pin; a stud carried by each of said skirt members extending through openings formed through the top wall of said head member; adjustable members associated with said studs whereby said head and skirt members are secured together in predetermined relative relation; and segmental concentric, interengaging walls on said head and skirt members whereby the skirt members are maintained in the proper operative position, said head and skirt members being spaced apart at intervals to present openings therebetween for the free flow of a lubricant.

JOHN PEARL ORRIS.